(12) United States Patent
Funk et al.

(10) Patent No.: US 10,606,866 B1
(45) Date of Patent: Mar. 31, 2020

(54) FRAMEWORK FOR EXPOSING NETWORK ACTIVITIES

(71) Applicant: Palantir Technologies Inc., Palo Alto, CA (US)

(72) Inventors: Benjamin Funk, London (GB); Christian Burchhardt, Palo Alto, CA (US); Jakob Juelich, Brandenburg (DE); Lawrence Manning, New York, NY (US); Matthew Elkherj, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 307 days.

(21) Appl. No.: 15/491,845

(22) Filed: Apr. 19, 2017

Related U.S. Application Data

(60) Provisional application No. 62/479,041, filed on Mar. 30, 2017.

(51) Int. Cl.
*G06F 16/28* (2019.01)
*G06F 16/951* (2019.01)

(52) U.S. Cl.
CPC .......... *G06F 16/284* (2019.01); *G06F 16/951* (2019.01)

(58) Field of Classification Search
CPC .............................. G06F 16/284; G06F 16/951
USPC ........................................................ 707/722
See application file for complete search history.

(56) References Cited

U.S. PATENT DOCUMENTS

| | | |
|---|---|---|
| 6,374,251 B1 | 4/2002 | Fayyad et al. |
| 6,567,936 B1 | 5/2003 | Yang et al. |
| 6,775,675 B1 | 8/2004 | Nwabueze et al. |
| 6,980,984 B1 | 12/2005 | Huffman et al. |
| 7,373,669 B2 | 5/2008 | Eisen |

(Continued)

FOREIGN PATENT DOCUMENTS

| | | | |
|---|---|---|---|
| EP | 1191463 | 3/2002 | |
| EP | 1335557 A1 * | 8/2003 | ............. H04L 43/00 |

(Continued)

OTHER PUBLICATIONS

Ahmed et al., "Time-Based Sampling of Social Network Activity Graphs", in Proceedings of the Eighth Workshop on Mining and Learning with Graphs (MLG '10), Washington, DC, USA, Jul. 24-25, 2010, pp. 1-9. (Year: 2010).*

(Continued)

*Primary Examiner* — Phuong Thao Cao

(74) *Attorney, Agent, or Firm* — Sheppard Mullin Richter & Hampton LLP

(57) ABSTRACT

Systems and methods are provided for investigation of network activities. Network activity information may be accessed. The network activity information may describe for an individual (1) respective relationship with one or more persons; and (2) respective activity status information indicating whether a given person has engaged in a particular activity. A network activity graph may be generated based on the network activity information. The network activity graph may include two or more nodes representing the individual and the one or more persons. Connections between the nodes may represent the respective relationships between the individual and the one or more persons. Data corresponding to the network activity graph may be presented through an interface.

15 Claims, 9 Drawing Sheets

(56) References Cited

U.S. PATENT DOCUMENTS

| | | | |
|---|---|---|---|
| 7,451,397 B2 | 11/2008 | Weber et al. | |
| 7,539,697 B1* | 5/2009 | Akella | H04L 51/32 |
| 7,574,409 B2 | 8/2009 | Patinkin | |
| 7,596,285 B2 | 9/2009 | Brown et al. | |
| 7,783,658 B1 | 8/2010 | Bayliss | |
| 7,805,457 B1 | 9/2010 | Viola et al. | |
| 7,814,102 B2 | 10/2010 | Miller et al. | |
| 8,046,362 B2 | 10/2011 | Bayliss | |
| 8,095,652 B2* | 1/2012 | Rudy | H04L 67/1095 709/224 |
| 8,135,679 B2 | 3/2012 | Bayliss | |
| 8,135,719 B2 | 3/2012 | Bayliss | |
| 8,150,844 B2* | 4/2012 | Redstone | G06Q 10/10 707/724 |
| 8,266,168 B2 | 9/2012 | Bayliss | |
| 8,266,697 B2* | 9/2012 | Coffman | H04L 63/14 709/224 |
| 8,301,904 B1 | 10/2012 | Gryaznov | |
| 8,312,546 B2 | 11/2012 | Alme | |
| 8,321,943 B1 | 11/2012 | Walters et al. | |
| 8,347,398 B1 | 1/2013 | Weber | |
| 8,447,674 B2 | 5/2013 | Choudhuri et al. | |
| 8,484,168 B2 | 7/2013 | Bayliss | |
| 8,495,077 B2 | 7/2013 | Bayliss | |
| 8,498,969 B2 | 7/2013 | Bayliss | |
| 8,554,653 B2 | 10/2013 | Falkenborg et al. | |
| 8,560,413 B1 | 10/2013 | Quarterman | |
| 8,600,872 B1 | 12/2013 | Yan | |
| 8,682,764 B2* | 3/2014 | Love | G06Q 10/10 705/35 |
| 8,682,812 B1 | 3/2014 | Ranjan | |
| 8,689,108 B1* | 4/2014 | Duffield | G06Q 30/02 715/737 |
| 8,726,379 B1 | 5/2014 | Stiansen et al. | |
| 8,736,612 B1* | 5/2014 | Goldman | G06Q 50/01 345/440 |
| 8,788,405 B1 | 7/2014 | Sprague et al. | |
| 8,788,407 B1 | 7/2014 | Singh et al. | |
| 8,793,255 B1* | 7/2014 | Bilinski | G06Q 10/06393 707/740 |
| 8,818,892 B1 | 8/2014 | Sprague et al. | |
| 8,893,024 B2* | 11/2014 | Wanas | G06Q 10/10 715/733 |
| 8,959,092 B2* | 2/2015 | Sparrow | G06F 16/435 707/749 |
| 9,009,827 B1 | 4/2015 | Albertson et al. | |
| 9,043,894 B1 | 5/2015 | Dennison et al. | |
| 9,135,658 B2 | 9/2015 | Sprague et al. | |
| 9,165,299 B1 | 10/2015 | Stowe et al. | |
| 9,171,334 B1 | 10/2015 | Visbal et al. | |
| 9,177,344 B1 | 11/2015 | Singh et al. | |
| 9,202,249 B1 | 12/2015 | Cohen et al. | |
| 9,230,280 B1 | 1/2016 | Maag et al. | |
| 9,256,664 B2 | 2/2016 | Chakerian et al. | |
| 9,294,497 B1* | 3/2016 | Ben-Or | H04L 63/1433 |
| 9,344,447 B2 | 5/2016 | Cohen et al. | |
| 9,367,872 B1 | 6/2016 | Visbal et al. | |
| 9,665,632 B2* | 5/2017 | Morsi | G06F 16/254 |
| 9,787,640 B1* | 10/2017 | Xie | H04L 63/0263 |
| 9,942,334 B2* | 4/2018 | Giacobbe | H04L 67/22 |
| 10,305,922 B2* | 5/2019 | Devi Reddy | H04L 63/1441 |
| 2002/0156724 A1* | 10/2002 | Levchin | G06Q 20/10 705/39 |
| 2002/0194119 A1 | 12/2002 | Wright et al. | |
| 2003/0033228 A1 | 2/2003 | Bosworth-Davies et al. | |
| 2003/0074368 A1 | 4/2003 | Schuetze et al. | |
| 2003/0097330 A1 | 5/2003 | Hillmer et al. | |
| 2003/0154044 A1 | 8/2003 | Lundstedt et al. | |
| 2003/0187813 A1* | 10/2003 | Goldman | G06Q 10/10 |
| 2004/0205524 A1 | 10/2004 | Richter et al. | |
| 2005/0108063 A1 | 5/2005 | Madill et al. | |
| 2005/0222928 A1 | 10/2005 | Steier et al. | |
| 2006/0004892 A1* | 1/2006 | Lunt | G06Q 30/0275 |
| 2006/0095521 A1 | 5/2006 | Patinkin | |
| 2006/0218637 A1 | 9/2006 | Thomas et al. | |
| 2007/0106582 A1 | 5/2007 | Baker et al. | |
| 2007/0192265 A1 | 8/2007 | Chopin et al. | |
| 2007/0294200 A1 | 12/2007 | Au | |
| 2008/0133567 A1 | 6/2008 | Ames et al. | |
| 2008/0148398 A1 | 6/2008 | Mezack et al. | |
| 2008/0222706 A1* | 9/2008 | Renaud | H04L 63/1408 726/4 |
| 2008/0288425 A1 | 11/2008 | Posse et al. | |
| 2009/0018940 A1 | 1/2009 | Wang et al. | |
| 2009/0024505 A1 | 1/2009 | Patel et al. | |
| 2009/0044279 A1 | 2/2009 | Crawford et al. | |
| 2009/0082997 A1 | 3/2009 | Tokman et al. | |
| 2009/0083184 A1 | 3/2009 | Eisen | |
| 2009/0172821 A1 | 7/2009 | Daira et al. | |
| 2009/0192957 A1 | 7/2009 | Subramanian et al. | |
| 2009/0254970 A1 | 10/2009 | Agarwal et al. | |
| 2009/0254971 A1 | 10/2009 | Herz | |
| 2009/0265106 A1* | 10/2009 | Bearman | G06Q 10/00 701/300 |
| 2009/0271359 A1 | 10/2009 | Bayliss | |
| 2009/0300589 A1 | 12/2009 | Watters et al. | |
| 2009/0318775 A1 | 12/2009 | Michelson et al. | |
| 2010/0077481 A1 | 3/2010 | Polyakov et al. | |
| 2010/0077483 A1 | 3/2010 | Stolfo et al. | |
| 2010/0100963 A1 | 4/2010 | Mahaffey | |
| 2010/0106611 A1 | 4/2010 | Paulsen et al. | |
| 2010/0125546 A1 | 5/2010 | Barrett et al. | |
| 2010/0138375 A1* | 6/2010 | Hanner | H04L 63/0263 706/48 |
| 2010/0169237 A1 | 7/2010 | Howard et al. | |
| 2010/0185691 A1 | 7/2010 | Irmak et al. | |
| 2010/0306029 A1 | 12/2010 | Jolley | |
| 2010/0330801 A1 | 12/2010 | Rouh | |
| 2011/0055140 A1 | 3/2011 | Roychowdhury | |
| 2011/0087519 A1 | 4/2011 | Fordyce, III et al. | |
| 2011/0093327 A1 | 4/2011 | Fordyce, III et al. | |
| 2011/0107436 A1* | 5/2011 | Cholas | H04N 21/2541 726/29 |
| 2011/0131122 A1 | 6/2011 | Griffin et al. | |
| 2011/0167054 A1 | 7/2011 | Bailey et al. | |
| 2011/0167493 A1 | 7/2011 | Song et al. | |
| 2011/0173093 A1 | 7/2011 | Psota et al. | |
| 2011/0178842 A1 | 7/2011 | Rane et al. | |
| 2011/0219450 A1 | 9/2011 | McDougal et al. | |
| 2011/0225650 A1 | 9/2011 | Margolies et al. | |
| 2011/0231223 A1 | 9/2011 | Winters | |
| 2011/0238510 A1 | 9/2011 | Rowen et al. | |
| 2011/0238553 A1 | 9/2011 | Raj et al. | |
| 2011/0238570 A1 | 9/2011 | Li et al. | |
| 2011/0246229 A1 | 10/2011 | Pacha | |
| 2011/0251951 A1 | 10/2011 | Kolkowitz | |
| 2011/0307382 A1 | 12/2011 | Siegel et al. | |
| 2011/0314546 A1 | 12/2011 | Aziz et al. | |
| 2012/0004904 A1 | 1/2012 | Shin et al. | |
| 2012/0084135 A1 | 4/2012 | Nissan et al. | |
| 2012/0084866 A1 | 4/2012 | Stolfo | |
| 2012/0131107 A1 | 5/2012 | Yost | |
| 2012/0158626 A1 | 6/2012 | Zhu et al. | |
| 2012/0215898 A1 | 8/2012 | Shah et al. | |
| 2012/0254129 A1 | 10/2012 | Wheeler et al. | |
| 2012/0310831 A1 | 12/2012 | Harris et al. | |
| 2012/0310838 A1 | 12/2012 | Harris et al. | |
| 2012/0311684 A1 | 12/2012 | Paulsen et al. | |
| 2013/0006426 A1 | 1/2013 | Healey et al. | |
| 2013/0006655 A1 | 1/2013 | Van Arkel et al. | |
| 2013/0006668 A1 | 1/2013 | Van Arkel et al. | |
| 2013/0018796 A1 | 1/2013 | Kolhatkar et al. | |
| 2013/0024307 A1 | 1/2013 | Fuerstenberg et al. | |
| 2013/0024339 A1 | 1/2013 | Choudhuri et al. | |
| 2013/0085877 A1* | 4/2013 | Ruhrig | G06Q 20/02 705/21 |
| 2013/0117278 A1* | 5/2013 | Martens | G06Q 20/4016 707/748 |
| 2013/0151388 A1 | 6/2013 | Falkenborg et al. | |
| 2013/0160120 A1 | 6/2013 | Malaviya et al. | |
| 2013/0166550 A1 | 6/2013 | Buchmann et al. | |
| 2013/0185320 A1 | 7/2013 | Iwasaki et al. | |
| 2013/0197925 A1 | 8/2013 | Blue | |

(56) References Cited

U.S. PATENT DOCUMENTS

| | | | |
|---|---|---|---|
| 2013/0211985 A1 | 8/2013 | Clark et al. | |
| 2013/0212479 A1* | 8/2013 | Willis | G06Q 10/10 715/736 |
| 2013/0232045 A1 | 9/2013 | Tai et al. | |
| 2013/0276799 A1 | 10/2013 | Davidson | |
| 2013/0318594 A1 | 11/2013 | Hoy et al. | |
| 2013/0339218 A1 | 12/2013 | Subramanian et al. | |
| 2013/0339514 A1 | 12/2013 | Crank et al. | |
| 2014/0006109 A1 | 1/2014 | Callioni et al. | |
| 2014/0013244 A1* | 1/2014 | Lindsay | G06Q 50/01 715/753 |
| 2014/0032506 A1 | 1/2014 | Hoey et al. | |
| 2014/0040244 A1* | 2/2014 | Rubinstein | G06Q 50/01 707/722 |
| 2014/0058763 A1 | 2/2014 | Zizzamia et al. | |
| 2014/0081652 A1 | 3/2014 | Klindworth | |
| 2014/0089320 A1* | 3/2014 | Baldwin | G06Q 50/01 707/748 |
| 2014/0129261 A1 | 5/2014 | Bothwell et al. | |
| 2014/0149130 A1 | 5/2014 | Getchius | |
| 2014/0149272 A1 | 5/2014 | Hirani et al. | |
| 2014/0149436 A1 | 5/2014 | Bahrami et al. | |
| 2014/0156484 A1 | 6/2014 | Chan et al. | |
| 2014/0283067 A1 | 9/2014 | Call et al. | |
| 2014/0310282 A1 | 10/2014 | Sprague et al. | |
| 2014/0331119 A1 | 11/2014 | Dixon et al. | |
| 2014/0379812 A1 | 12/2014 | Bastide et al. | |
| 2015/0058320 A1* | 2/2015 | Zheng | G06F 21/6245 707/722 |
| 2015/0066912 A1* | 3/2015 | Vaynblat | G06Q 50/01 707/722 |
| 2015/0067533 A1 | 3/2015 | Volach | |
| 2015/0088908 A1* | 3/2015 | Fukuda | H04N 21/252 707/749 |
| 2015/0089424 A1* | 3/2015 | Duffield | G06Q 10/00 715/771 |
| 2015/0120583 A1* | 4/2015 | Zarrella | G06Q 30/018 705/317 |
| 2015/0178825 A1 | 6/2015 | Huerta | |
| 2015/0235334 A1 | 8/2015 | Wang et al. | |
| 2015/0302068 A1* | 10/2015 | Morsi | G06F 16/254 707/602 |
| 2015/0312192 A1* | 10/2015 | Bagby | G06F 16/955 709/206 |
| 2015/0332344 A1* | 11/2015 | Vaynblat | G06Q 50/01 705/14.53 |
| 2015/0379158 A1* | 12/2015 | Infante-Lopez | G06F 16/9024 707/798 |
| 2016/0004764 A1 | 1/2016 | Chakerian et al. | |
| 2016/0034470 A1 | 2/2016 | Sprague et al. | |
| 2016/0048937 A1 | 2/2016 | Mathura et al. | |
| 2016/0080403 A1* | 3/2016 | Cunningham | H04L 63/1425 726/23 |
| 2016/0180451 A1 | 6/2016 | Visbal et al. | |
| 2016/0224561 A1* | 8/2016 | Agarwal | G06Q 50/01 |
| 2016/0283884 A1* | 9/2016 | Wilson | G06Q 10/06393 |
| 2016/0337217 A1* | 11/2016 | Chan | G06N 7/005 |
| 2017/0149814 A1* | 5/2017 | Chen | H04L 63/1425 |
| 2017/0243127 A1* | 8/2017 | Zhu | G06N 7/005 |
| 2017/0289287 A1* | 10/2017 | Modi | G06F 16/951 |
| 2018/0032588 A1* | 2/2018 | Nor | H04L 41/12 |
| 2018/0039647 A1* | 2/2018 | Winstanley | G06F 16/9535 |
| 2018/0083992 A1* | 3/2018 | Bose | H04L 63/1425 |

FOREIGN PATENT DOCUMENTS

| | | | | |
|---|---|---|---|---|
| EP | | 2555153 | 2/2013 | |
| EP | | 2911078 | 8/2015 | |
| EP | | 2963577 | 1/2016 | |
| EP | | 2985729 | 2/2016 | |
| EP | | 3018879 | 5/2016 | |
| EP | | 3037991 | 6/2016 | |
| EP | | 3038046 | 6/2016 | |
| EP | | 2884418 B1 * | 3/2017 | G06Q 30/0185 |
| GB | | 2513247 | 10/2014 | |
| WO | WO 2008/011728 | | 1/2008 | |
| WO | WO 2008/113059 | | 9/2008 | |
| WO | WO 2013/126281 | | 8/2013 | |

OTHER PUBLICATIONS

Devaux E., "Using Graphs Visualization for Network Intelligence Analysis", posted on Nov. 29, 2016, 11 pages, accessed online at <https://linkurio.us/blog/using-graphs-for intelligence-analysis/> on Apr. 13, 2019. (Year: 2016).*

Karabiyik et al., "A Survey of Social Network Forensics", Journal of Digital Forensics, Security and Law: vol. 11, No. 4, Article 8, pp. 55-128, dated Dec. 31, 2016. (Year: 2016).*

Singh et al., "Interactive Visual Analysis of Anomalous Accounts Payable Transactions in SAP Enterprise Systems", Managerial Auditing Journal, vol. 31, No. 1, 2016, pp. 35-63. (Year: 2016).*

Xia Z., "Fighting Criminals: Adaptive Inferring and Choosing the Next Investigative Objects in the Criminal Network", Knowledge-Based Systems 21 (2008): pp. 434-442. (Year: 2008).*

Chau, P., "Catching Bad Guys with Graph Mining", XRDS: Crossroads, The ACM Magazine for Student, vol. 17, No. 3, Spring 2011 , pp. 16-18. (Year: 2011).*

Van der Hulst, R. C., "Introduction to Social Network Analysis (SNA) as an Investigative Tool", Trends Organ Crim (2009) 12: pp. 101-121. (Year: 2009).*

Rathle, P., "How Graph Databases Uncover Patterns to Break Up Organized Crime", article dated May 31, 2014, accessed online at <https://thenewstack.io/how-graph-databases-uncover-patterns-to-break-up-organized-crime/> on Nov. 4, 2019 (Year: 2014).*

US 8,712,906, 04/2014, Sprague et al. (withdrawn)

US 8,725,631, 05/2014, Sprague et al. (withdrawn)

"A Word About Banks and the Laundering of Drug Money," Aug. 18, 2012, http://www.golemxiv.co.uk/2012/08/a-word-about-banks-and-the-laundering-of-drug-money/.

"Money Laundering Risks and E-Gaming: A European Overview and Assessment," 2009, http://www.cf.ac.uk/socsi/resources/Levi_Final_Money_Laundering_Risks_egaming.pdf.

"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.

"Using Whois Based Geolocation and Google Maps API for Support Cybercrime Investigations," http://wseas.us/e-library/conferences/2013/Dubrovnik/TELECIRC/TELECIRC-32.pdf, 2013, pp. 194-200.

Alfred, Rayner "Summarizing Relational Data Using Semi-Supervised Genetic Algorithm-Based Clustering Techniques", Journal of Computer Science, 2010, vol. 6, No. 7, pp. 775-784.

Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.

Golmohammadi et al., "Data Mining Applications for Fraud Detection in Securities Market," Intelligence and Security Informatics Conference (EISIC), 2012 European, IEEE, Aug. 22, 2012, pp. 107-114.

Gu et al., "BotMiner: Clustering Analysis of Network Traffice for Protocol-and-Structure-Independent Botnet Detection," USENIX Security Symposium, 2008, 17 pages.

Hodge et al., "A Survey of Outlier Detection Methodologies," Artificial Intelligence Review, vol. 22, No. 2, Oct. 1, 2004, pp. 85-126

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

(56) References Cited

OTHER PUBLICATIONS

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Li et al., "Identifying the Signs of Fraudulent Accounts using Data Mining Techniques," Computers in Human Behavior, vol. 28, No. 3, Jan. 16, 2012, pp. 1002-1013.
Ngai et al., "The Application of Data Mining Techniques in Financial Fraud Detection: A Classification Framework and an Academic Review of Literature," Decision Support Systems, Elsevier Science Publishers, Amsterdam, Netherlands, vol. 50, No. 3, Feb. 1, 2011.
Nolan et al., "MCARTA: A Malicious Code Automated Run-Time Analysis Framework," Homeland Security (HST) 2012 IEEE Conference on Technologies for, Nov. 13, 2012, pp. 13-17.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Notice of Allowance for U.S. Appl. No. 14/616,080 dated Apr. 2, 2015.
Official Communication for U.S. Appl. No. 14/473,552 dated Feb. 24, 2015.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175171.8 dated Nov. 25, 2015.
Official Communication for European Patent Application No. 15180515.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for Great Britain Application No. 1404457.2 dated Aug. 14, 2014.
Official Communication for Netherlands Patent Application No. 2012433 dated Mar. 11, 2016.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/486,991 dated Mar. 10, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/698,432 dated Jun. 3, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/857,071 dated Mar. 2, 2016.
Official Communication for U.S. Appl. No. 15/072,174 dated Jun. 1, 2016.
Perdisci et al., "Behavioral Clustering of HTTP-Based Malware and Signature Generation Using Malicious Network Traces," USENIX, 18 Mar. 2010, pp. 1-14.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Quartert FS "Resource Center," Oct. 16, 2014, retrieved from https://web.archive.org/web/20141016044306/http://quartetfs.com/resource-center/white-papers retrieved May 3, 2016.
Restriction Requirement for U.S. Appl. No. 14/857,071 dated Dec. 11, 2015.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Symantec Corporation, "E-Security Begins with Sound Security Policies," Announcement Symantec, Jun. 14, 2001.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

\* cited by examiner

| Entities Table 210 | |
|---|---|
| ID | Type |
| 1001 | Person |
| 1002 | Person |
| 1003 | Person |
| 1004 | Person |
| 1005 | Person |
| 1006 | Person |
| 1101 | Link A |
| 1102 | Link B |
| 1103 | Link C |
| 1104 | Link D |

FIGURE 2A

| Link Table 220 | | |
|---|---|---|
| ID1 | ID2 | Type |
| 1001 | 1101 | Linking A |
| 1001 | 1103 | Linking C |
| 1001 | 1104 | Linking D |
| 1002 | 1101 | Linking A |
| 1002 | 1102 | Linking B |
| 1003 | 1102 | Linking B |
| 1003 | 1103 | Linking C |
| 1004 | 1101 | Linking A |
| 1004 | 1104 | Linking D |
| 1005 | 1102 | Linking B |
| 1006 | 1102 | Linking B |
| 1006 | 1103 | Linking C |

FIGURE 2B

| Attributes Table 230 | | |
| --- | --- | --- |
| ID | Attribute Type | Value |
| 1001 | Person Attribute 1 | String A-1 |
| 1001 | Person Attribute 2 | String A-2 |
| 1001 | Person Attribute 3 | Binary A-3 |
| 1002 | Person Attribute 1 | String B-1 |
| 1003 | Person Attribute 1 | String C-1 |
| 1004 | Person Attribute 1 | String D-1 |
| 1005 | Person Attribute 1 | String E-1 |
| 1006 | Person Attribute 2 | String F-2 |
| 1101 | Link Attribute 1 | String L-1 |
| 1102 | Link Attribute 1 | String L-2 |
| 1102 | Link Attribute 2 | Binary L-2 |
| 1103 | Link Attribute 3 | Number L-3 |
| 1104 | Link Attribute 3 | Number L-4 |

FIGURE 2C

| Score Table 240 | |
| --- | --- |
| ID | Value |
| 1001 | Metric |
| 1002 | Metric |
| 1003 | Metric |
| 1004 | Metric |
| 1005 | Metric |
| 1006 | Metric |

FIGURE 2D

FRAMEWORK FOR EXPOSING NETWORK ACTIVITIES

CROSS REFERENCE TO RELATED APPLICATIONS

This application claims the benefit under 35 U.S.C. § 119(e) of U.S. Provisional Application Ser. No. 62/479,041 Mar. 30, 2017, the content of which is incorporated by reference in its entirety into the present disclosure.

FIELD OF THE INVENTION

This disclosure relates to approaches for surfacing, investigating, and exposing network activities.

BACKGROUND

Under conventional approaches, surfacing, investigating, and exposing network activities (e.g., network of criminal activities) may require analysis of properties/characteristics of persons, accounts, and/or linking traits. Finding, viewing, and linking persons/accounts/traits may be time consuming and very difficult. The time required and the difficulty of finding, viewing, and linking persons/accounts/traits may result in inaccurate/incomplete view of network activities.

SUMMARY

Various embodiments of the present disclosure may include systems, methods, and non-transitory computer readable media configured to facilitate investigating network activities. Various embodiments of the present disclosure may include systems, methods, and non-transitory computer readable media configured to access network activity information. The network activity information may describe for an individual (1) respective relationship with one or more persons; and (2) respective activity status information indicating whether a given person has engaged in a particular activity. A network activity graph may be generated based on the network activity information. The network activity graph may include two or more nodes representing the individual and the one or more persons. Connections between the nodes may represent the respective relationships between the individual and the one or more persons. Data corresponding to the network activity graph may be presented through an interface.

In some embodiments, the respective relationships of the individual with the one or more persons may include a linking entity that connects the individual to at least one of the one or more persons.

In some embodiments, the systems, methods, and non-transitory computer readable media are configured to (1) determine a density metric for the individual based on the respective relationships with the one or more persons; (2) determine an association metric for the individual based on the respective activity status information of the one or more persons; and (3) provide information describing the individual for investigation to be presented through the interface based on the density metric and the association metric.

In some embodiments, the density metric for the individual may be determined based on a number of relationship loops formed by the respective relationships of the individual with the one or more persons and one or more sizes of the relationship loops.

In some embodiments, the association metric for the individual may be determined based on a propagation function. The association metric for the individual may be determined further based on (1) one or more weights associated with the one or more persons, (2) one or more weights associated with the respective relationships between the individual and the one or more persons, or (3) one or more weights associated with the one or more persons and the respective relationships between the individual and the one or more persons. The systems, methods, and non-transitory computer readable media may be configured to assign or change (1) at least one of the weights associated with the one or more persons, (2) at least one of the one or more weights associated with the respective relationships between the individual and the one or more persons, or (3) at least one of the one or more weights associated with the one or more persons and the respective relationships between the individual and the one or more persons.

In some embodiments, the systems, methods, and non-transitory computer readable media are configured to change an update rule by which the association metric is updated.

In some embodiments, the systems, methods, and non-transitory computer readable media are configured to present a build-up user interface. The build-up user interface may enable a user to (1) view a list of entities added to an investigation, (2) view a list of related entities, and (3) add one or more of the related entities to the investigation. The systems, methods, and non-transitory computer readable media may be configured to render a network activity graph based on the investigation built by the user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A-D illustrate example tables storing network activity information, in accordance with various embodiments.

DETAILED DESCRIPTION

Figure 1:
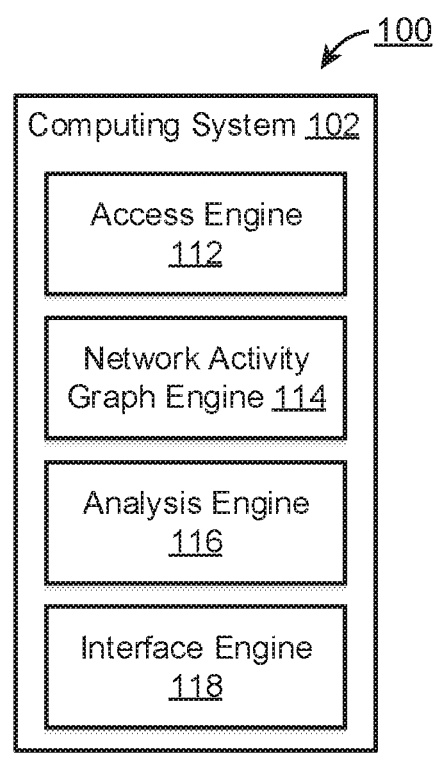
FIG. 1 illustrates an example environment for investigating network activities, in accordance with various embodiments.

A claimed solution rooted in computer technology overcomes problems specifically arising in the realm of computer technology. In various implementations, a computing system is configured to access network activity information. The network activity information may include information that describes for an individual: (1) relationships with other persons and (2) whether the other persons have engaged in a particular activity (e.g., criminal activity). The computing system may generate a network activity graph based on the network activity information. The network activity graph may include nodes representing persons and connections between the nodes representing relationships between the persons. The network activity graph may include nodes representing linking objects (e.g., accounts/properties) that link two or more persons. The computing system may determine a density metric and an association metric for the individual. The density metric may be determined based on the individual's relationship with other persons and the association metric may be determined based on whether the other persons have engaged in the particular activity. The computing system may surface the individual for investigation based on the density metric and the association metric. The computing system may present a build-up user interface. The build-up user interface may enable a user to (1) view a list of entities added to an investigation, (2) view a list of related entities, and (3) add one or more of the related entities to the investigation. The computing system may render a network activity graph based on the investigation built by the user.

As used herein, the term "investigation" refers to a line of inquiry or analysis to uncover one or more network activities. An investigation may include one or more steps to analyze, surface, and expose network activities. A network activity may refer to particular action(s) performed by multiple individuals. A network activity may occur at a point in time/a particular location or over a range of times/ranges of locations. For example, a network activity may refer to one or more suspicious (or criminal) activities (e.g., financial crimes) engaged in by multiple individuals. Multiple individuals may be engaged in one or more network activities in concert and/or using one or more shared resources (e.g., bank account). In general, an investigation may be shared by multiple users, multiple users may collaborate on a single investigation via multiple client devices, individual users may have their own separate investigations, or individual users may work on individual investigations via individual client devices.

The invention disclosed herein enables users to conduct investigations of network activities using links/connections between individuals and identification of individuals who have engaged in one or more particular activities. The invention disclosed herein provides for an analytical tool capable of investigating and surfacing a holistic picture of network activity from a single/few leads in a short duration of time. For example, a single lead (e.g., a person, an event, an account) may be used to build out a network of coordinated activities by using links between nodes (representing entities) of a network activity graph, anomalous degrees of connectedness between the nodes, and information regarding entities engaged in one or more particular activities. The initial lead(s) may come from a variety of sources (e.g., government, organization, company, individuals, network models). The approaches disclosed herein may allow a user to expose network activities and/or potential targets of the network activities, and allow for visualization of entities, timeline(s) of events, and respective locations associated with entities to provide a holistic data picture of network activities. The results of the investigation may be shared among investigators and may promote collaboration among investigations. New data for analysis may be flagged as alerts. An alert/stop for entities may be generated to prevent entities from further/future engagement of the particular activities.

FIG. 1 illustrates an example environment 100 for investigating network activities, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include an access engine 112, a network activity graph engine 114, an analysis engine 116, an interface engine 118, and/or other engines.

In various embodiments, the access engine 112 is configured to access network activity information. Network activity information may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system through a network). Network activity information may be included within a single file or included across multiple files. Network activity information may include tables that include relational data. For example, network activity information may be stored as data in a database including multiple tables and/or information that can be accessed by a database management system/platform. The data included in the tables may provide a flexible backend for the network activity investigation systems/methods disclosed herein. The data included in the tables may be indexed and allow for fast joins to combine information included in multiple tables. Individual and/or combined information may be provided in one or more user interfaces as disclosed herein.

Network activity information may describe for one or more individuals (1) respective relationships with one or more persons and (2) respective activity status information indicating whether a given person has engaged in one or more particular activities. Respective relationships of an individual with one or more persons may each include a corresponding linking entity that connects the individual to one or more persons. An entity may refer to a living or non-living thing that is distinct from other living or non-living things. An entity may refer a group of living and/or non-living things that is distinct from other groups of living and/or non-living things. For example, an entity may refer to an individual, an organization, a business, an account, a location, a date, an event, and/or other distinct things. A linking entity may refer to an entity that links individuals together or groups of individuals together. A linking entity may refer to an entity that is shared by/among multiple individuals (or groups of individuals). For example, a linking entity may refer to a resource, tool, and/or account (e.g., bank account, phone number, IP address) shared by/among multiple individuals (or groups of individuals).

Network activity information may be stored as data in multiple tables. For example, network activity information may be stored in (1) an entities table, (2) a link table, (3) an attributes table, and/or other tables/structures. The entities table may define different entities. Different entities may be differentiated within the entities table by different identification codes or other markers. The entities table may include information regarding the type of different entities (e.g., individuals, linking entities). The link table may define respective relationships between different entities. For example, a row of a link table may define links between two entities by providing the identification codes of the two entities within a single row. The entities table and the link table may include other/different information. For example, the link table may include information regarding the types of links between entities and/or the types of roles engaged by a particular individual in a link. For example, the link table may include information that two entities are linked by an event type. In another example, a link between two individuals may be based on a phone call between the two individuals and the link table may include information that defines the caller and the callee.

The attributes table may include information regarding attributes of different entities. The entities may be differentiated by their identification codes, and the attributes table may include information that defines the type of attribute being defined (e.g., an individual's attribute, a linking entity's attribute) and the values associated with the attributes (e.g., string, number, binary). For example, the attributes table may include respective activity status information indicating whether a given person has engaged in one or more particular activities (e.g., a string that describes the activity engaged, a number that indicates the activity engaged, a binary value that indicates whether the activity has been engaged in or not).

In some embodiments, the attributes table may store different types of attributes for different types of entities. As an example, the attributes table may store for an individual one or more of name, address, phone number, birth date, nationality, gender, engaged activities (identification of activity, number/percentage of activity), characteristics relating one or more investigations (e.g., suspicion level, amount of money/property involved, type of investigation), and/or other information. As another example, the attributes table may store for an account one or more of identification number, status (open/closed), date, location, description, characteristics relating one or more investigations (e.g., suspicion level, amount of money/property involved, type of investigation), owner(s) of the account, user(s) of the account, and/or other information. In some embodiments, one or more tables may be combined and/or divided. For example, data included within the attributes table may be combined with data included in the entities table. As another example, information regarding whether the individuals have engaged in one or more particular activities may be stored separately (e.g., in an activities table). Other data and tables for network activity information are contemplated.

Data in two or more tables may be combined to enable lead generation for an investigation. For example, data in the entities table and the link table may be combined to create a graph of related entities as disclosed herein. Additional information, such as data in the attributes tables, may be used to augment/complement the information presented within the graph of related entities and allow a user to find one or more entities (e.g., individuals, accounts) for investigation. Indexing of the data included in the table may allow for fast joins between the data. Fast joins may be effectuated by one or more SQL instructions/joins to combine data from two sets of data (e.g., included in two tables). In some embodiments, fast joins may be achieved using one or more relationships (e.g., primary key, foreign key) between different sets of data. For example, the data included in the entities table and the link table may be joined using the identification codes of the entities. Joins of data may be performed using one or more of inner join, outer join (left outer join, right outer join, full outer join), natural join, cross join, self-join, and/or other joins.

In some embodiments, data included in the tables, or portions thereof, may be associated with time/date. For example, a linking entity for multiple individuals may include a bank account, and the attributes, as well as changes to the attributes, of the bank account may be time-stamped. Time-stamping at least a portion of the network activity information may enable tracking of changes in connections/activities of connected individuals and may provide additional information for leads generation.

Leads generation may refer to the process of analyzing network activity information for one or more individuals and identifying one or more individuals (and/or one or more linking entities) for investigation as to whether the particular individual(s) have engaged in particular activities (and/or particular linking entity, or entities, have been used in particular activities). For example, leads generation may include analysis of data stored in the entities table, the link table, the attributes table, and/or other tables to determine whether a network of individuals are engaged in one or more particular activities. Leads generation may allow for identification of persons/linking entities to uncover one or more network(s) of persons engaged in one or more particular activities. Individuals may be scored (e.g., propensity score) based on likelihood of the individuals engaging in the particular activities. The scores may be stored in one or more tables discussed above (e.g., in the attributes table) and/or stored in other tables (e.g., in a score table). Score of individuals may be propagated through the graph of related entities using connections (respective relationships/links) between the entities.

For example, network activity information may define six individuals and four linking entities. The six individuals may be connected to each other (directly and/or indirectly) through one or more linking entities. One or more individuals may be identified as having participated in an activity of interest (e.g., one of the individuals is an identified participant in a criminal activity) and/or as having a likelihood of having participated in the activity of interest (e.g., one of the individuals is a suspect in a criminal activity). The scores (e.g., propensity score) of the individual(s) may be proportional to the likelihood of the individuals having engaged in the activity of interest. The scores of these individuals may be propagated through the graph of related entities using the connections (respective relationships/links) between the individuals/linking entities.

In various embodiments, the network activity graph engine 114 is configured to generate one or more network activity graphs based on the network activity information. A network activity graph may include a graph of related entities as defined by the network activity information (e.g., combination of data included in the entities table and the link table). A network activity graph may include two or more nodes and edges connecting the nodes. The nodes of a network activity graph may represent entities defined by the network activity information (e.g., data included in entities table). For example, the nodes of a network activity graph may represent individuals and/or linking entities (e.g., bank accounts, phone numbers, IP addresses). Connections (edges) between the nodes may represent the respective relationships between the entities (e.g., between an individual and one or more persons).

For example, based on the network activity information defining six individuals and four linking entities, the network activity graph engine 114 may generate a network activity graph including six nodes for six individuals, four nodes for linking entities, and edges between the nodes based on the respective relationships between the individuals/linking entities. In some embodiments, the network activity graph engine 114 may allow a user to reduce a network activity graph based on features of interest. For example, the network activity graph engine 114 may reduce a network activity graph by removing the nodes for the linking entities to generate a network activity graph showing people-to-people relationships. As another example, the network activity graph engine 114 may allow a user to focus on relationships of certain types (e.g., show within the graph only links of certain types or remove links of certain types).

In various embodiments, the analysis engine 116 is configured to analyze the network activity information and/or the network activity graph to facilitate investigation of network activities. The analysis engine 116 may be configured to (1) determine a density metric for one or more individuals based on respective relationships of the individual(s) with one or more persons and (2) determine an association metric for one or more individuals based on respective activity status information of one or more persons.

A density metric may refer to a measure of how densely an individual (and/or persons around the individual) is connected to other persons/entities. Use of density metric for leads generation may enable identification/prioritization of persons who may be engaged in a network activity (e.g., systematic criminal activity engaged in by/involving multiple persons) rather than lone actors. In some embodiments, the density metric for the individual may be determined based on a number of relationship loops formed by respective relationships of an individual with one or more persons and one or more sizes of the relationship loops. A relationship loop may refer to a closed cycle formed by entities/linking entities and connection between the entities/linking entities. For example, individual within a network activity graph may include person A, person B, and person C, and linking entities may include linking entity A, linking entity B, and linking entity C. Person A may be connected to person B through linking entity A. Person B may be connected to person C through linking entity B. And person C may be connected to Person A through linking entity C. The nodes for persons A, B, C, and linking entities A, B, C and the edges between the nodes may form a relationship loop.

A size of a relationship loop may refer to a number of individuals within the relationship loop, a number of linking entities within the relationship loop, a number of edges between nodes in the relationship loop, a number of non-looping branches which extends from the relationship loop, the length of non-looping branches that extends from the relationship loop, and/or other characteristics relating to the size of the relationship loop. In some embodiments, the relationship loop may be classified based on the types of linking entities. For example, referring to the relationship loop, discussed above, including persons A, B, C and linking entities A, B, C, the size of the relationship loop may be determined based on three nodes corresponding to the three persons, three nodes corresponding to the three links, a number of edges between the nodes, and/or other characteristics of the relationship loop. For example, the size of the relationship loop may correspond to a length of six (for the number of edges between the nodes).

In some embodiments, the density metric for an individual may be determined based on numbers and sizes of relationship loops including the individuals. For example, for an individual, the number and sizes of the relationship loops may be determined to be as follows: (1) one cycle of length four, (2) two cycles of length six, (3) two cycles of length eight. In some embodiments, the density metric for an individual may be determined based on numbers and sizes of relationship loops surrounding the individual. For example, a density metric for an individual may be determined by pivoting out from the individual by a particular amount (e.g., one) and counting the number and sizes of relationship loops including the individual and/or the persons at the particular distance (e.g., one) from the individual.

An association metric may refer to a measure of how likely an individual may have participated/may be participating in one or more particular activities. For example, an association metric may include a propensity score as discussed herein and/or other metrics. An association metric for an individual may allow for ranking of persons based on how the persons are connected to another person/linking entity associated with one or more particular activities. For example, referring to connections between persons A, B, C and linking entities A, B, C discussed above, one or more individuals may be identified as having participated in an activity of interest (e.g., one of the individuals is an identified participant in a criminal activity) and/or as having a likelihood of having participated in the activity of interest (e.g., one of the individuals is a suspect in a criminal activity). The scores of these individuals may refer their identification with regards to the activity of interest. The scores of these individuals may be propagated through the network activity graph using the connections (respective relationships/links) between the persons/linking entities. The propagation of the scores (e.g., propensity score) may depend on the number of links, the lengths of links, the types of links, and/or other information. An individual who is connected more closely to a person with a certain propensity score may be scored closer to the certain propensity score than another individual who is further away. An individual who is connected multiple ways to a person with a certain propensity score may be scored closer to the certain propensity score than another individual who is connected in fewer ways.

For example, an association metric for individuals in a network activity graph may be determined based on pivoting. A person in the network activity graph may be identified as having engaged in a particular activity and all persons around that person may be scored as having engaged in/or have a likelihood of having engaged in the particular activity. As another example, a linking entity within the network activity graph may be identified as being involved in the particular activity and all persons connected to the linking entity may be scored as having engaged in/or have a likelihood of having engaged in the particular activity. The number of pivoting from the person identified has having engaged in the particular activity/linking entity identified has being involved in the particular activity may be changed.

As another example, an association metric for individuals in a network activity graph may be determined based on selective pivoting. Selective pivoting may account for the number of individuals who have been identified as having engaged in a particular activity and the number of persons within a relationship loop. The propagation of an association metric (e.g., propensity score) through a network activity graph may depend on the size of the relationship loop and how many persons within the loop may have been identified as having engaged in a particular activity. For example, a linking entity may connect five individuals, one of whom has been identified as having engaged in a particular activity. The selective pivot score for the linking entity may be determined to be ⅕ (one person identified as having engaged in the particular activity out of five total persons). The propagation of the association metric may depend on the selective pivot score such that higher selective pivot score leads to greater propagation (e.g., value, distance) and lower selective pivot score leads to smaller propagation (e.g., value, distance).

Selective pivoting may account for the types of linking entities by which individuals are connected. For example, an IP address may be associated with thousands of individuals and a phone number may be associated with a few individuals. The propagation of the association metric may depend on the types of linking entities such that the types of linking entities associated with fewer numbers of individuals may lead to greater propagation (e.g., value, distance) and the types of linking entities associated with greater numbers of individuals may lead to smaller propagation (e.g., value, distance). Selective pivoting may account for the types of linking entities by which individuals are connected and the number of individuals connected to the linking entities. For example, a linking entity of type bank account with numbers of linked individuals less than eight may have an update score weight (defining impact on association metric propagation) of 0.8. A linking entity corresponding to an IP address with a number of linked individuals less than fifty may have an update score weight of 0.6. Other combinations of linking entity types, numbers of linked individuals, and impact on association metric propagation are contemplated.

In some embodiments, an association metric for an individual may be determined based on a propagation function. A propagation function may alter/propagate association metrics for individuals through a network activity graph using a flexible framework. For example, a propagation function may include flexible label propagation and/or other propagation methods. A propagation function may use one or more label propagation algorithms to determine/update association metrics for different individuals. A label propagation algorithm may determine association metrics for individuals that capture the identification of individual(s) as having engaged in one or more particular activities as well as smoothing over nearby relationships. A label propagation algorithm may randomly assign a score (e.g., propensity score) to all individuals and apply updates to the scores based on known identification of individuals that engaged in one or more particular activities. Updates may include iterative updates, incremental updates, and/or other updates. Updates may stop when the updates have converged (e.g., when the difference between the prior value and the updated value of the association metric is below a threshold or the derivative of loss is less than some value).

In some embodiments, an association metric for an individual may be determined further based on (1) one or more weights associated with the one or more persons, (2) one or more weights associated with the respective relationships between the individual and the one or more persons, or (3) one or more weights associated with the one or more persons and the respective relationships between the individual and the one or more persons. For example, the flexible framework for propagating association metric may enable a user to assign weights to different entities (e.g., individuals, linking entities) and/or connections between entities to affect the strength of propagation through a network activity graph.

In some embodiments, the analysis engine 116 may be configured to assign or change (1) at least one of the weights associated with the one or more persons, (2) at least one of the one or more weights associated with the respective relationships between the individual and the one or more persons, or (3) at least one of the one or more weights associated with the one or more persons and the respective relationships between the individual and the one or more persons. For example, the flexible framework for propagating association metric may enable a user to tune weights of different entities (e.g., individuals, linking entities) and/or connections between entities to affect the strength of propagation through a network activity graph. As another example, the flexible framework for propagating association metric may enable a user to define the extent to which an association metric may propagate through a network activity graph (e.g., define the extent of boundary for propagation (e.g., three pivots)).

The association metric for the individual may be updated. The updates may be based on time (e.g., period basis), changes in the network activity information (e.g., inclusion of new entity, changes in identification of individuals having engaged in a particular activity), and/or based on user input (e.g., user command to update the association metric). New/changed data in the network activity information may be flagged for review by one or more users. In some embodiments, one or more rules by which the association metric is updated/propagated may be changed. Changes in the rule(s) may include changes in the propagation function/label propagation algorithm(s), changes in the extent of boundary for propagation, changes in the data used, changes in weights, and/or other changes. A flexible framework for determining association metric may enable a user to easily use variance of association metric propagation (e.g., objective function, update rule) and/or variance of the data set for analysis.

The analysis engine 116 may use a combination of density metric and association metric to identify individuals/linking entities for investigation for particular activities. The analysis engine 116 may identify individuals/linking entities as part of leads generation. Combination of density metric and association metric may include aggregation of the density metric and the association metric. For example, a combination of a density metric and an association metric may include average or sum of the two metrics. Other combinations of density metric and association metric are contemplated. The combination of density metric and association metric for leads generation may enable the analysis engine 116 to prioritize individuals (1) strongly connected to persons known to have engaged in one or more particular activities and (2) located in a dense region of the network activity graph.

In various embodiments, the interface engine 118 is configured to present data corresponding to one or more network activity graphs through one or more interfaces. The data may include information describing one or more individuals/linking entities for investigation based on the density metric and the association metric. The interface engine 118 may present data that identifies one or more individuals/linking entities for investigation of particular activities (e.g., leads generation).

In some embodiments, the interface engine 118 may be configured to present a build-up user interface. A build-up user interface may enable a user to (1) view a list of entities added to an investigation, (2) view a list of related entities, and (3) add one or more related entities to the investigation. The build-up user interface may include options to enable a user to choose to create a new investigation, work on an existing investigation, or save an investigation. The build-up user interface may include a first region that display entities added to an investigation and a second region that lists attributes of one or more entities (responsive to a user choosing one or more entities added to the investigation in the first region). The build-up user interface may include a third region that display one or more related entities (responsive to a user choosing one or more attributes in the second region). The build-up user interface may include options to allow the user to add one or more related entities to the investigation. The build-up user interface may include a searching function that enables a user to search for a particular individual (e.g., individual added to an investigation or potentially being added to the investigation). The build-up user interface may include other/different regions.

The data included in the network activity information may be indexed to allow for fast joins and presentation within one or more interfaces presented by the interface engine 118. Indices of data included in tables of the network activity information may be generated on the fly, at periodic intervals, based on user command, based on changes in the network activity information, and/or other information. For example, an index for searching of entities may be generated and stored in response to searches so that subsequent search results may be presented more quickly. The entities table, the attributes table, the link table, and/or other tables may be used to provide the information within one or more interfaces. One or more interfaces presented by the interface engine may enable a user to change one or more values of the network activity information. Changes made by a user through one or more interfaces (e.g., addition of an individual to an investigation, marking of an individual/linking entity as potentially having engaged in a particular activity) may be reflected in one or more tables of the network activity information.

In some embodiments, the interface engine 118 may be configured to render one or more network activity graphs based on investigation(s) built by a user. For example, the interface engine 118 may render a network activity graph based on the entities table and the link table. The network activity graph may be augmented/complemented with additional information, such as based on data in the attributes table. In some embodiments, the interface engine 118 may be configured to change the entities/links included in the network activity graph based on a user's interaction with the network activity graph (e.g., removing a node, creating a new connection between nodes).

In some embodiments, the interface engine 118 may be configured to provide information relating to one or more entities/connections between entities included in a network activity graph. For example, the interface engine 118 may provide a timeline associated with changes in a network activity graph, maps of locations relating to the entities in the network activity graph, and/or other information relating to one or more entities/connections between entities included in the network activity graph. In some embodiments, the interface engine 118 may be configured to provide summary information for an investigation. The summary information may include aggregated statistics and/or trends in a particular area of a network activity graph. For example, the summary information may include (1) a list of entities added to an investigation, (2) one or more characteristics relating the investigation (e.g., amount of money/property involved, type of investigation), (3) times/locations relating to the network activity graph, and/or other information. In some embodiments, the interface engine 118 may enable a user to generate an alert/stop for one or more individuals/linking entities, which may be used to prevent the individuals/linking entities from further/future engagement of the particular activities.

FIGS. 2A-D illustrate example tables storing network activity information, in accordance with various embodiments. As shown in FIG. 2A, an entities table 210 may define different entities. Different entities may be differentiated within the entities table 210 by different identification codes (ID). The entities table 210 may include information regarding the type of different entities (e.g., person, link A, link B, link C, link D). As shown in FIG. 2B, a link table 220 may define respective relationships between different entities (e.g., defined in the entities table 210). For example, a row of the link table 220 may define links between two entities by providing the identification codes of the two entities within a single row. For example, the first row of the link table 220 may indicate that a person (ID 1001) and a linking entity (ID 1101) are linked. The entities table 210 and the link table 220 may include other/different information. For example, the link table 220 may include information regarding the types of links between entities and/or the types of role engaged by a particular individual in a link. For example, the link table 220 may include information that define the type of link between a person (ID 1001) and a linking entity (ID 1101) as Linking A. As another example, a link between two individuals may be established based on a call between the two individuals and the link table 220 may include information that defines the caller and the callee.

As shown in FIG. 2C, an attributes table 230 may include information regarding attributes of different entities (e.g., defined in the entities table 210). The entities may be differentiated by their identification codes (ID), and the attributes table 230 may include information that defines the type of attribute being defined (e.g., person attributes, link attributes) and the values associated with the attributes (e.g., string, number, binary). For example, the attributes table 230 may include respective activity status information indicating whether a given person has engaged in one or more particular activities (e.g., string that describes the activity engaged, number that indicates the activity engaged, binary that indicates whether the activity has been engaged in or not).

In some embodiments, the attributes table 230 may store different types of attributes for different types of entities. For example, the attributes table 230 may store for an individual one or more of name, address, phone number, birth date, nationality, gender, engaged activities (identification of activity, number/percentage of activity), characteristics relating one or more investigations (e.g., suspicion level, amount of money/property involved, type of investigation), and/or other information. As another example, the attributes table 230 may store for an account (a linking entity) one or more of identification number, status (open/closed), date, location, description, characteristics relating one or more investigations (e.g., suspicion level, amount of money/property involved, type of investigation), owner(s) of the account, user(s) of the account, and/or other information.

As shown in FIG. 2D, a score table 240 may include information regarding association metrics of different entities (e.g., defined in the entities table 210). The entities may be differentiated by their identification codes (ID), and the score table 240 may include information/values of the association metric for the different entities. Association metric may include one or more numbers, characters, and/or combinations of numbers and characters.

In some embodiments, one or more tables 210, 220, 230, 240 may be combined and/or divided. For example, data included within the attributes table 230 may be combined with data included in the entities table 210. As another example, information regarding whether the individuals have engaged in one or more particular activities may be stored separately (e.g., in an activities table). Other data and tables are contemplated.

Figure 3A:
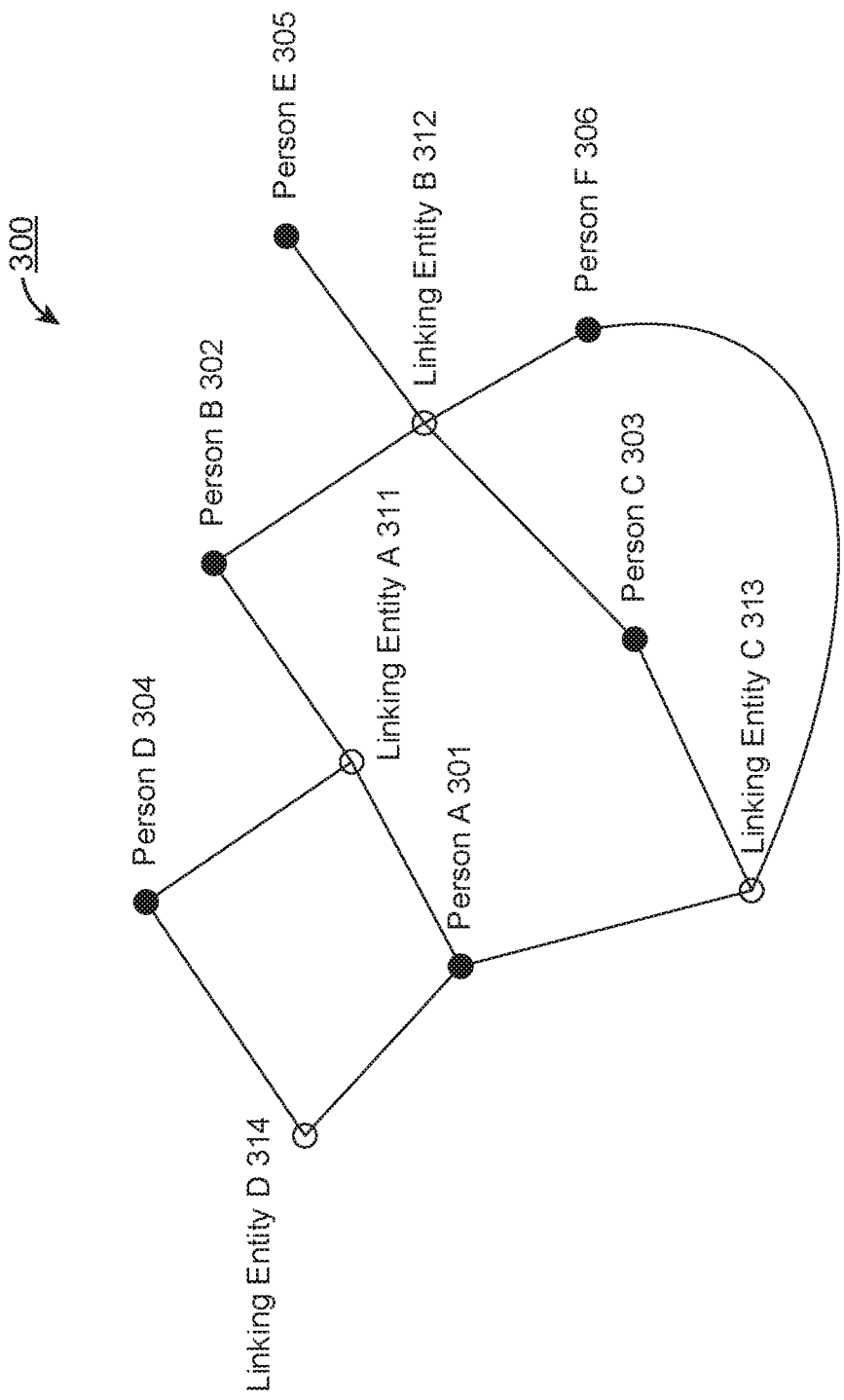
FIGS. 3A-B illustrate example network activity graphs, in accordance with various embodiments.
Figure 3B:
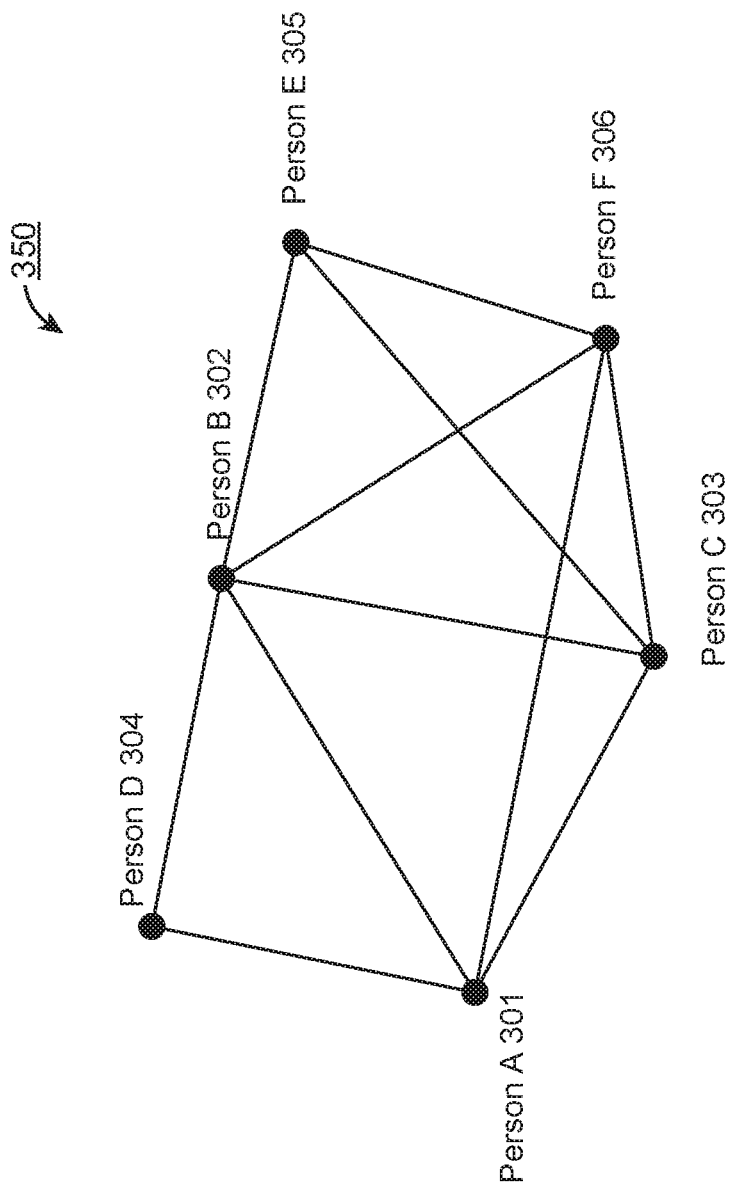

FIGS. 3A-B illustrate example network activity graphs 300, 350, in accordance with various embodiments. The network activity graph 300 may be generated by the network activity graph engine 114 based on network activity information (e.g., data included in the tables 210, 220). As shown in FIG. 3A, the network activity graph 300 may include nodes representing individuals (person A 301, person B 302, person C 303, person D 304, person E 305, person F 306) and nodes representing linking entities (linking entity A 311, linking entity B 312, linking entity C 313, linking entity D 314). The nodes may be connected by edges, indicating relationship between the respective nodes/entities. For example, person A 301 may correspond to ID 1001 in the entitles table 210 and the link table 220, person B 302 may correspond to ID 1002 in the entitles table 210 and the link table 220, person C 303 may correspond to ID 1003 in the entitles table 210 and the link table 220, person D 304 may correspond to ID 1004 in the entitles table 210 and the link table 220, person E 305 may correspond to ID 1005 in the entitles table 210 and the link table 220, and person F 306 may correspond to ID 1006 in the entitles table 210 and the link table 220. Linking entity A 311 may correspond to ID 1101 in the entitles table 210 and the link table 220, linking entity B 312 may correspond to ID 1102 in the entitles table 210 and the link table 220, linking entity C 313 may correspond to ID 1103 in the entitles table 210 and the link table 220, and linking entity D 314 may correspond to ID 1104 in the entitles table 210 and the link table 220. Based on the data included in the tables 210, 220, person A 301, person B 302, and person D 304 may be linked by the linking entity A 311. Person B 302, person C 303, person E 305, and person F 306 may be linked by the linking entity B 312. Person A 301, person C 303, and person F 306 may be linked by the linking entity C 313. Person A 301 and person D 304 may be linked by the linking entity D 314.

FIG. 3B shows the network activity graph 350, which may include a reduction of the network activity graph 300 by the network activity graph engine 114 to remove the nodes for the linking entities 311, 312, 313, 314. The network activity graph 350 shows people-to-people relationships for persons 301, 302, 303, 204, 305, 306. The network activity graph 350 shows that person A 301 is linked to person B 302, person C 303, person D 304, and person F 306; person B 302 is linked to person A 301, person C 303, person D 304, person E 305, and person F 306; person C 303 is linked to person A 301, person B 302, person E 305, and person F 306; person D 304 is linked to person A 301 and person B 302; person E 305 is linked to person B 302, person C 303, and person F 306; and person F 306 is linked person A 301, person B 302, person C 303, and person E 305.

Figure 4A:
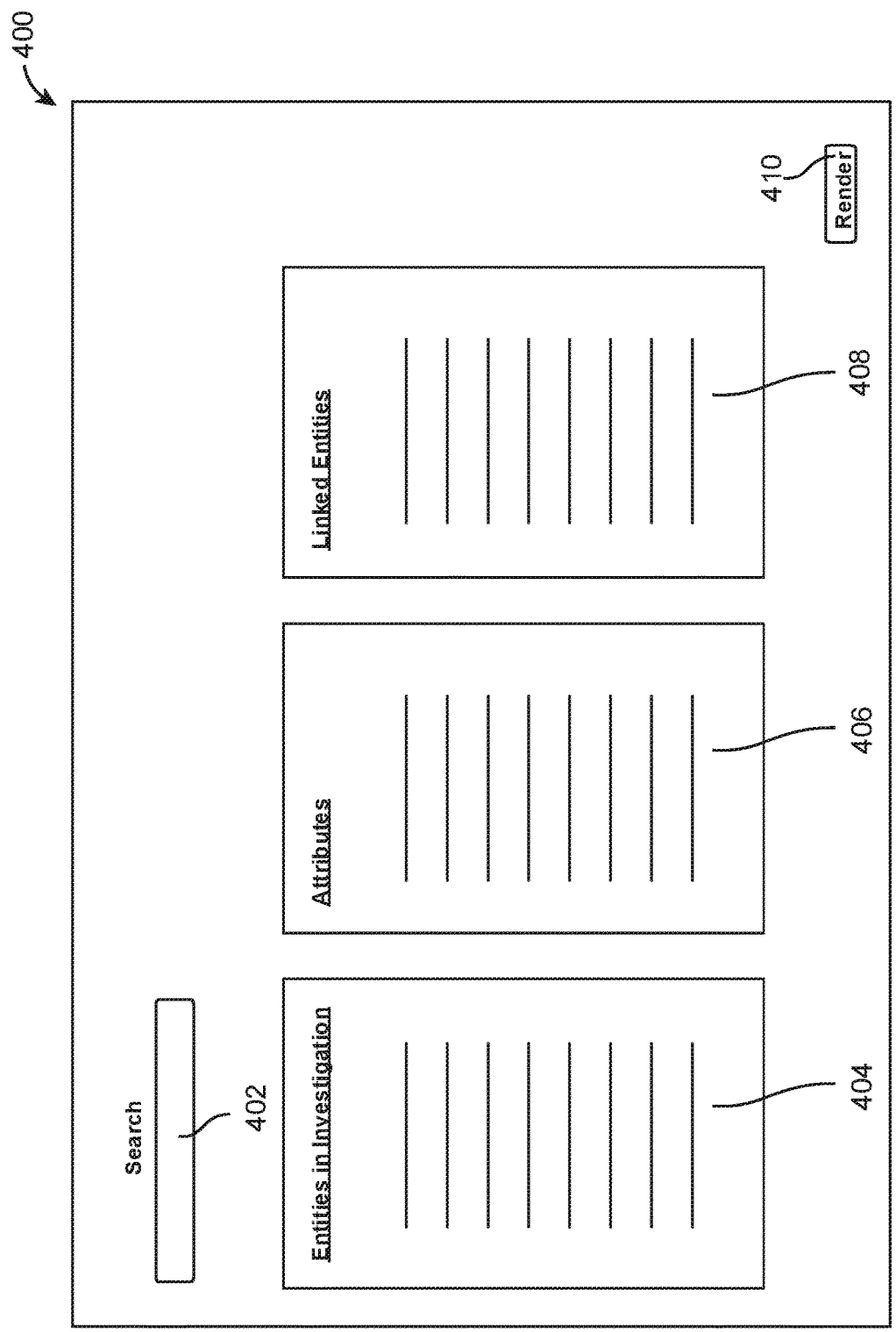
FIGS. 4A-B illustrate example interfaces for investigating network activities, in accordance with various embodiments.
Figure 4B:
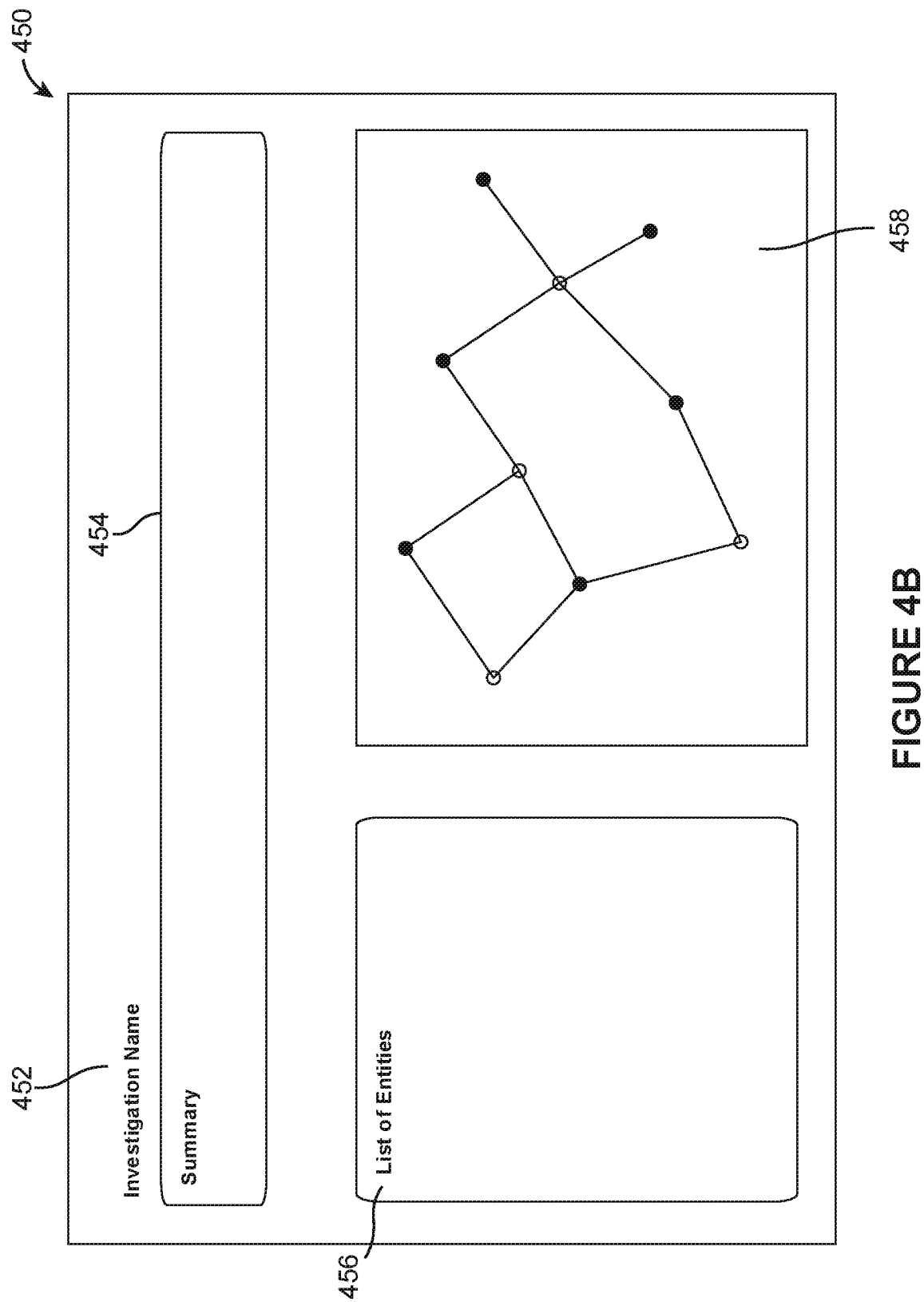

FIGS. 4A-B illustrate example interfaces 400, 450 for investigating network activities, in accordance with various embodiments. Data corresponding to one or more network activity graphs may be presented through the interfaces 400, 450 by the interface engine 118. As shown in FIG. 4A, the interface 400 includes a search field 402, an entities in investigation region 404, an attributes region 406, a linked entities region 408, and a render option 410. The interface 400 may enable a user to (1) view a list of entities added to an investigation, (2) view a list of related entities, and (3) add one or more related entities to the investigation. The interface 400 may include options to enable a user to choose to create a new investigation, work on an existing investigation, or save an investigation.

The entities in investigation region 404 may display entities added to an investigation. The attributes region 406 may display attributes of one or more entities listed in the entities in investigation region 404. For example, the attributes region 406 may display attributes of one or more entities selected by a user within the entities in investigation region 404. The linked entities region 408 may display one or more related entities. For example, a user may select a particular individual displayed in the entities in investigation region 404. The attributes region 406 may display the attributes of the particular individual. Responsive to a user's selection of one or more attributes of the particular individuals, the linked entities region 408 may display entities who are linked to the particular individual by the particular attribute(s) (e.g., clicking on a bank account of the particular individual may display a list of individuals also associated with the bank account). The interface 400 may include options to allow the user to add one or more related entities to the investigation.

The interface 400 may include a searching field 402 that enables a user to search for a particular individual (e.g., added to an investigation, for potential addition to the investigation). The interface 400 may include the render option 410, which allows a user to generate a network activity graph for the investigation. In some embodiments, the interface 400 may include options for a user to generate an alert/stop for one or more individuals/linking entities, which may be used to prevent the individuals/linking entities from further/future engagement of one or more particular activities. The interface 400 may include other/different regions.

As shown in FIG. 4B, the interface 450 includes an investigation name region 452, a summary region 454, a list of entities region 456, and a presentation region 458. The investigation name region 452 may display the name of the investigation being shown in the interface 450. The summary region 454 may display summary information for the investigation. Summary information may include aggregated statistics and/or trends relating to the investigation. For example, the summary information may include (1) a number of entities added to the investigation, (2) one or more characteristics relating the investigations (e.g., amount of money/property involved, type of investigation), and/or (3) times/locations relating to a network activity graph, and/or other information. The list of entities region 456 may list entities added to the investigation. The presentation region 458 may display one or more visual information relating to the investigation. For example, as shown in FIG. 4B, the presentation region 458 may display a network activity graph for the investigation. As another example, the presentation region 458 may display (e.g., in addition to or in place of the network activity graph), one or more maps showing locations corresponding to the entities in the investigation and/or timeline of events to provide a holistic picture of the investigation. Other presentation of visual information are contemplated.

Figure 5:
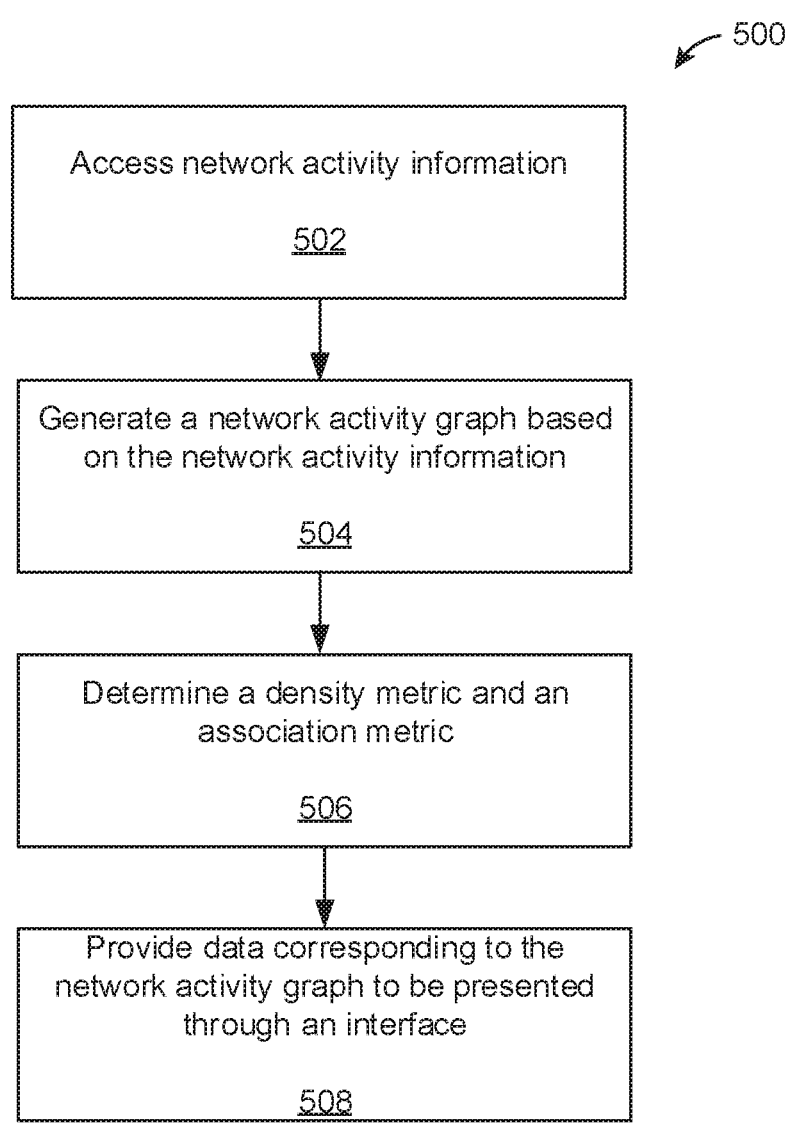
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, network activity information may be accessed. The network activity information may describe for an individual (1) respective relationships with one or more persons; and (2) respective activity status information of one or more persons, the respective activity status information indicating whether a given person has engaged in a particular activity. At block 504, a network activity graph may be generated based on the network activity information. The network activity graph may include two or more nodes representing the individual and one or more persons, and connections between two or more nodes representing respective relationships between the individual and one or more persons. At block 506, a density metric and an association metric for the individual may be determined. The density metric may be determined based on the respective relationships of the individual with one or more persons. The association metric may be determined based on the respective activity status information of the one or more persons. At block 508, data corresponding to the network activity graph may be provided to be presented through an interface. The data may include information describing the individual for investigation.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
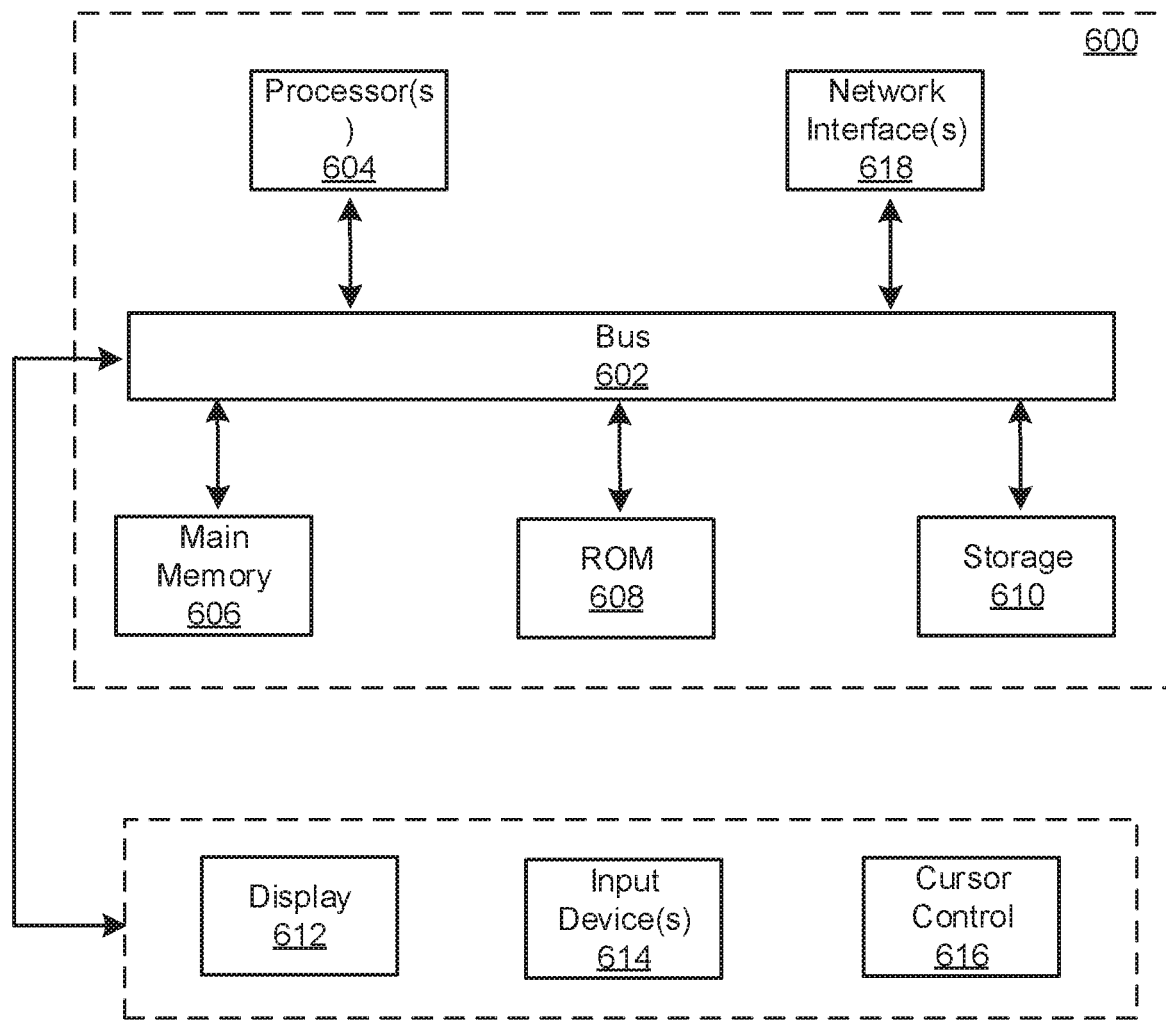
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executed by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   memory storing instructions that, when executed by the one or more processors, cause the system to perform:

accessing network activity information, the network activity information describing for an individual:
respective relationships with one or more persons; and
respective activity status information of the one or more persons, the respective activity status information indicating whether a given person has engaged in a particular activity;
generating a network activity graph based on the network activity information, the network activity graph including two or more nodes representing the individual and the one or more persons, and connections between the two or more nodes representing the respective relationships between the individual and the one or more persons;
providing data corresponding to the network activity graph to be presented through an interface;
determining a density metric for the individual based on the connections of the network activity graph between the two or more nodes representing the respective relationships between the individual and the one or more persons, wherein the density metric for the individual is determined based on a number of relationship loops formed by the respective relationships of the individual with the one or more persons and one or more sizes of the relationship loops;
determining an association metric for the individual based on the respective activity status information of the one or more persons; and
providing information describing the individual for investigation to be presented through the interface based on a combination of the density metric and the association metric.

2. The system of claim 1, wherein the respective relationships of the individual with the one or more persons include a linking entity that connects the individual to at least one of the one or more persons.

3. The system of claim 1, wherein the association metric for the individual is determined based on a propagation function.

4. The system of claim 1, wherein the association metric for the individual is determined further based on one or more weights associated with the one or more persons, one or more weights associated with the respective relationships between the individual and the one or more persons, or one or more weights associated with the one or more persons and the respective relationships between the individual and the one or more persons.

5. The system of claim 4, wherein the instructions further cause the system to perform:
assigning or changing at least one of the one or more weights associated with the one or more persons, at least one of the one or more weights associated with the respective relationships between the individual and the one or more persons, or at least one of the one or more weights associated with the one or more persons and the respective relationships between the individual and the one or more persons.

6. The system of claim 1, wherein the instructions further cause the system to perform:
changing an update rule by which the association metric is updated.

7. The system of claim 1, wherein the instructions further cause the system to perform presenting a build-up user interface, the build-up user interface enabling a user to:
view a list of entities added to an investigation;
view a list of related entities; and
add one or more of the related entities to the investigation.

8. A method implemented by a computing system including one or more processors and storage media storing machine-readable instructions, wherein the method is performed using the one or more processors, the method comprising:
accessing network activity information, the network activity information describing for an individual:
respective relationships with one or more persons; and
respective activity status information of the one or more persons, the respective activity status information indicating whether a given person has engaged in a particular activity;
generating a network activity graph based on the network activity information, the network activity graph including two or more nodes representing the individual and the one or more persons, and connections between the two or more nodes representing the respective relationships between the individual and the one or more persons;
providing data corresponding to the network activity graph to be presented through an interface;
determining a density metric for the individual based on the connections of the network activity graph between the two or more nodes representing the respective relationships between the individual and the one or more persons, wherein the density metric for the individual is determined based on a number of relationship loops formed by the respective relationships of the individual with the one or more persons and one or more sizes of the relationship loops;
determining an association metric for the individual based on the respective activity status information of the one or more persons; and
providing information describing the individual for investigation to be presented through the interface based on a combination of the density metric and the association metric.

9. The method of claim 8, wherein the respective relationships of the individual with the one or more persons include a linking entity that connects the individual to at least one of the one or more persons.

10. The method of claim 8, wherein the association metric for the individual is determined based on a propagation function.

11. The method of claim 8, wherein the association metric for the individual is determined further based on one or more weights associated with the one or more persons, one or more weights associated with the respective relationships between the individual and the one or more persons, or one or more weights associated with the one or more persons and the respective relationships between the individual and the one or more persons.

12. The method of claim 11, further comprising assigning or changing at least one of the one or more weights associated with the one or more persons, at least one of the one or more weights associated with the respective relationships between the individual and the one or more persons, or at least one of the one or more weights associated with the one or more persons and the respective relationships between the individual and the one or more persons.

13. The method of claim 8, further comprising changing an update rule by which the association metric is updated.

14. The method of claim 8, further comprising presenting a build-up user interface, the build-up user interface enabling a user to:
- view a list of entities added to an investigation;
- view a list of related entities; and
- add one or more of the related entities to the investigation.

15. A non-transitory computer readable medium comprising instructions that, when executed, cause one or more processors to perform:
- accessing network activity information, the network activity information describing for an individual:
  - respective relationships with one or more persons; and
  - respective activity status information of the one or more persons, the respective activity status information indicating whether a given person has engaged in a particular activity;
- generating a network activity graph based on the network activity information, the network activity graph including two or more nodes representing the individual and the one or more persons, and connections between the two or more nodes representing the respective relationships between the individual and the one or more persons;
- providing data corresponding to the network activity graph to be presented through an interface;
- determining a density metric for the individual based on the connections of the network activity graph between the two or more nodes representing the respective relationships between the individual and the one or more persons, wherein the density metric for the individual is determined based on a number of relationship loops formed by the respective relationships of the individual with the one or more persons and one or more sizes of the relationship lops;
- determining an association metric for the individual based on the respective activity status information of the one or more persons; and
- providing information describing the individual for investigation to be presented through the interface based on a combination of the density metric and the association metric.

* * * * *